United States Patent
Kerby et al.

(10) Patent No.: US 6,344,870 B1
(45) Date of Patent: Feb. 5, 2002

(54) METHODS OF PROVIDING LOWER RESOLUTION FORMAT DATA INTO HIGHER RESOLUTION FORMAT

(75) Inventors: George H. Kerby; James G. Bearss, both of Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/710,151

(22) Filed: Nov. 9, 2000

Related U.S. Application Data

(62) Division of application No. 09/320,408, filed on May 26, 1999, now Pat. No. 6,295,078.

(51) Int. Cl.[7] .............................. B41J 2/47; B41J 2/435
(52) U.S. Cl. ...................................... 347/253; 347/247
(58) Field of Search ................................ 347/237, 239, 347/247, 255, 253; 358/296, 298, 443, 450; 395/102

(56) References Cited

U.S. PATENT DOCUMENTS

| | | | |
|---|---|---|---|
| 4,050,563 A | 9/1977 | Menhennett | 400/124.04 |
| 4,847,641 A | 7/1989 | Tung | 347/131 |
| 5,005,139 A | 4/1991 | Tung | 358/1.1 |
| 5,134,495 A | 7/1992 | Frazier et al. | 358/298 |
| 5,193,008 A | 3/1993 | Frazier et al. | 358/298 |
| 5,299,308 A | 3/1994 | Suzuki et al. | 345/501 |
| 5,359,423 A | 10/1994 | Loce | 358/296 |
| 5,392,061 A | 2/1995 | Vondran, Jr. | 347/252 |
| 5,424,780 A | 6/1995 | Cooper | 348/428.1 |
| 5,477,330 A * | 12/1995 | Dorr | 358/296 |
| 5,515,480 A | 5/1996 | Frazier | 358/1.9 |
| 5,517,318 A * | 5/1996 | Suzuki | 358/298 |
| 5,539,866 A | 7/1996 | Banton et al. | 358/1.18 |
| 5,561,721 A | 10/1996 | Mutz | 382/205 |
| 5,579,445 A | 11/1996 | Loce et al. | 358/1.2 |
| 5,663,800 A * | 9/1997 | Ainai | 358/296 |
| 5,724,157 A * | 3/1998 | Otani et al. | 358/450 |
| 5,850,295 A * | 12/1998 | Uchiyama et al. | 358/443 |
| 5,926,616 A * | 7/1999 | Sato et al. | 395/102 |

\* cited by examiner

Primary Examiner—Hai C. Pham

(57) ABSTRACT

Methods of providing lower resolution format data into higher resolution format are described. In one embodiment a first predetermined amount of image data is provided which is to be rendered onto a print medium. The first predetermined amount of image data is provided in a first resolution format. Using the first predetermined amount of image data, the first predetermined amount of image data is replicated into multiple predetermined amounts of data sufficient to provide said first predetermined amount of image data into a second resolution format which is greater than the first resolution format. At least one laser beam in a laser printer system is modulated using the multiple predetermined amounts of data.

3 Claims, 6 Drawing Sheets

| LASER 1 | 0 | 1 | | 1 | 0 | | 0 | 0 | | 0 | 0 |
|---|---|---|---|---|---|---|---|---|---|---|---|
| LASER 2 | 0 | 0 | | 0 | 0 | | 1 | 0 | | 0 | 1 |

| LASER 1 | 0 | 1 | | 1 | 0 | | 1 | 1 | | 0 | 0 |
|---|---|---|---|---|---|---|---|---|---|---|---|
| LASER 2 | 0 | 1 | | 1 | 0 | | 0 | 0 | | 1 | 1 |

| LASER 1 | 1 | 1 | | 1 | 1 | | 1 | 0 | | 0 | 1 |
|---|---|---|---|---|---|---|---|---|---|---|---|
| LASER 2 | 0 | 1 | | 1 | 0 | | 1 | 1 | | 1 | 1 |

| LASER 1 | 1 | 1 | | 0 | 0 | | 1 | 0 | | 0 | 1 |
|---|---|---|---|---|---|---|---|---|---|---|---|
| LASER 2 | 1 | 1 | | 0 | 0 | | 0 | 1 | | 1 | 0 |

FIG. 4

|  | 0000 | 0001 | 0010 | 0011 |
|---|---|---|---|---|
| LASER 1 | 0 | 0 | P1 | P1 |
| LASER 2 | 0 | P1 | P1 | P2 |

|  | 0100 | 0101 | 0110 | 0111 |
|---|---|---|---|---|
| LASER 1 | P2 | P2 | P1 | P3 |
| LASER 2 | P1 | P2 | P3 | P1 |

|  | 1000 | 1001 | 1010 | 1011 |
|---|---|---|---|---|
| LASER 1 | P2 | P3 | P3 | P2 |
| LASER 2 | P3 | P2 | P3 | P4 |

|  | 1100 | 1101 | 1110 | 1111 |
|---|---|---|---|---|
| LASER 1 | P4 | P3 | P4 | P4 |
| LASER 2 | P2 | P4 | P3 | P4 |

FIG. 5

METHODS OF PROVIDING LOWER RESOLUTION FORMAT DATA INTO HIGHER RESOLUTION FORMAT

This is a divisional of application Ser. No. 09/320,408 filed on May 26, 1999 now U.S. Pat. No. 6,295,078.

TECHNICAL FIELD

This invention relates in general to imaging systems and print resolution enhancement and, more particularly, to methods of providing lower resolution format data into a higher resolution format.

BACKGROUND

Electrophotographic processes for producing a permanent image on media are well known and commonly used. In general, a common process includes: (1) charging a photoreceptor such as a roller or continuous belt bearing a photoconductive material; (2) exposing the charged area to a light image to produce an electrostatic charge on the area in the shape of the image; (3) presenting developer particles (toner) to the photoreceptor surface bearing the image so that the particles are transferred to the surface in the shape of the image; (4) transferring the particles, in the shape of the image from the photoreceptor to the media; (5) fusing or fixing the particles in the shape of the image to the media; and (6) cleaning or restoring the photoreceptor for the next printing cycle. Many image forming apparatus, such as laser printers, copy machines, and facsimile machines, utilize this well known electrophotographic printing process.

In laser printers, an image is typically rasterized to form a bit pattern which is stored as a binary image bit map for subsequent rendering into a final output image. The image bitmap is also referred to as a picture element ("pixel") raster image. In the rasterizing process (i.e. forming the binary bitmap), graphic elements, such as continuous lines (line art) and text character outlines are converted to pixel patterns that approximate the source image shape. Continuous tone data, such as photographic data (both color and gray value images) are also converted to pixel patterns that approximate the source continuous tone image data. However, to effectively portray the original source image for continuous tone data, each pixel of the source image must be represented by multiple bits which define either a color or a gray level and which are subsequently converted, typically, to a binary image bitmap. Hereafter, it is to be understood that when the term "gray" is used, it applies to both color and black/white images and, when applied to a color image, relates to the intensity of the color.

Conventionally, in order to represent gray level images on a bi-level (black and white) printer, the pixel data, if not already gray level, is converted into a gray level, multi-bit configuration. For example, when a multi-bit configuration of 8 bits per pixel is employed, 256 gray levels can be represented by the digital pixel values. The individual gray level pixels are converted to binary level pixels (i.e., bi-level data for subsequent rendering) through the use of a dithering process. Spatial dithering is the converting of the multi-bit pixel values (of a source image) to fixed-size, binary, multi-pixel groupings that approximate the average gray value of the corresponding source data. This dithering process provides a halftoned texture to selected areas of the image so as to provide gray value variations therein. Thus, for example, with binary pixels, a 6×6 multi-pixel grouping can, in theory, simulate 36 levels of gray, and an 8×8 grouping can simulate 64 levels (with white being considered a shade of gray).

The dithering process (i.e. halftoning) employs a comparison of the individual pixel values (specified by a source image intensity array) to control the conversion of the gray level values to appropriate patterns of bi-level data. For purposes of this discussion, a gray level value of 255 in a source image is considered to be "white", and a gray level value of 0 is "black". The threshold matrix comprises a plurality of row-arranged gray level values which are stored in a resultant page buffer array (raster) bitmap. During the dithering process, the threshold matrix is tiled across the image pixels to enable each gray level image pixel to be compared against the correspondingly, logically positioned gray level value of the threshold matrix. In essence, each entry in the threshold matrix is a threshold gray level value which, if equal to or exceeded by the source image gray level pixel value, causes the gray level image pixel to be converted to a "white" pixel (or a binary logical "zero"). If, by contrast, the source image gray level pixel value is less than the corresponding threshold matrix gray level value, it is converted to a "black" pixel (or a binary logical "one"). Further aspects of dithering are discussed in the following patents which are assigned to the assignee of this document, the disclosures of which are incorporated by reference: U.S. Pat. Nos. 5,852,711, 5,625,756, and 5,548,689.

Thus far, the discussion has focused on the differences between rasterizing text (or line art) and halftone images. However, in either case, once a raster page buffer array bitmap is generated from a source image, whether the image is text, line art, or halftone, the desired output image is created (rendered) by causing a laser to be modulated in accordance with the bit pattern stored in the image page buffer array bitmap. The modulated laser beam is scanned across a charged surface of a photosensitive drum in succession of raster scan lines. Each scan line is divided into the pixel areas dictated by the resolution of the bitmap and the pitch of the laser scan. The modulated beam causes some pixel areas to be exposed to a light pulse and some not, thus causing a pattern of overlapping dots on each scan line. Where a pixel area (dot) is illuminated, the photosensitive drum is discharged, so that when it is subsequently toned, the toner adheres to the discharged areas and is repelled by the still-charged areas. The toner that is adhered to the discharged areas is then transferred to paper and fixed in a known manner.

In general, the fidelity of the output image relative to the source data is directly related to the resolution of pixels (dots) in the output image. Arbitrary analog images cannot be exactly reproduced by a bitmap raster unless an infinite resolution is used. For example, as a result of the image's pixel configuration, image edges that are either not parallel to the raster scan direction or not perpendicular to it appear stepped. This is especially noted in text and line art.

With the advent of higher resolution output, the amount of data and thus memory required to render a page goes up dramatically. When a higher resolution print engine receives source image data that is lower in resolution than what the print engine is actually capable of, scaling must occur to map the lower resolution data to the higher resolution print engine. Scaling may, however, actually diminish the image integrity which is unacceptable.

It is advantageous to work with lower resolution source data rather than higher resolution source data from a data processing perspective. Specifically, it is much less time consuming (less data to be processed) and cheaper (less hardware or memory intensive) to work with lower resolution data than higher resolution data.

This invention arose out of concerns associated with providing improved methods of providing lower resolution format data into a higher resolution format.

SUMMARY

Methods of providing lower resolution format data into higher resolution format are described.

In one embodiment a first predetermined amount of image data is provided which is to be rendered onto a print medium. The first predetermined amount of image data is provided in a first resolution format. Using the first predetermined amount of image data, the first predetermined amount of image data is replicated into multiple predetermined amounts of data sufficient to provide the first predetermined amount of image data into a second resolution format which is greater than the first resolution format. At least one laser beam in a laser printer system is modulated using the multiple predetermined amounts of data.

In another embodiment, a laser printing system is provided having first and second lasers configured to receive and be driven by raster data. Image data which is to be rendered onto a print medium is received in a first resolution format. The first resolution format is converted into a second resolution format which is greater than the first resolution format by mapping the image data to provide mapped image raster data in the second resolution format. The first laser is driven with a portion of the mapped image raster data, and the second laser is driven with another portion of the mapped image raster data.

In yet another embodiment, a laser printing system is provided and configured with a single laser and two dedicated line buffers. Raster data is provided into the two dedicated line buffers. The single laser is driven with raster data which is contained in one of the dedicate line buffers. After driving the laser with the data in the one buffer, switching takes place to the other of the two dedicated line buffers. The single laser is then driven with raster data which is contained in the other of the two dedicated line buffers. Preferably, switching continues back and forth between the two dedicated line buffers until a print job is complete.

BRIEF DESCRIPTION OF THE DRAWINGS

The present invention is illustrated by way of example and not limitation in the figures of the accompanying drawings. The same numbers are used throughout the figures reference like components and/or features.

FIG. 4 is a diagram which illustrates one aspect of a mapping procedure in accordance with one or more embodiments of the invention.

FIG. 5 is a diagram which illustrates one aspect of a mapping procedure in accordance with one or more embodiments of the invention.

DETAILED DESCRIPTION

Figure 1:
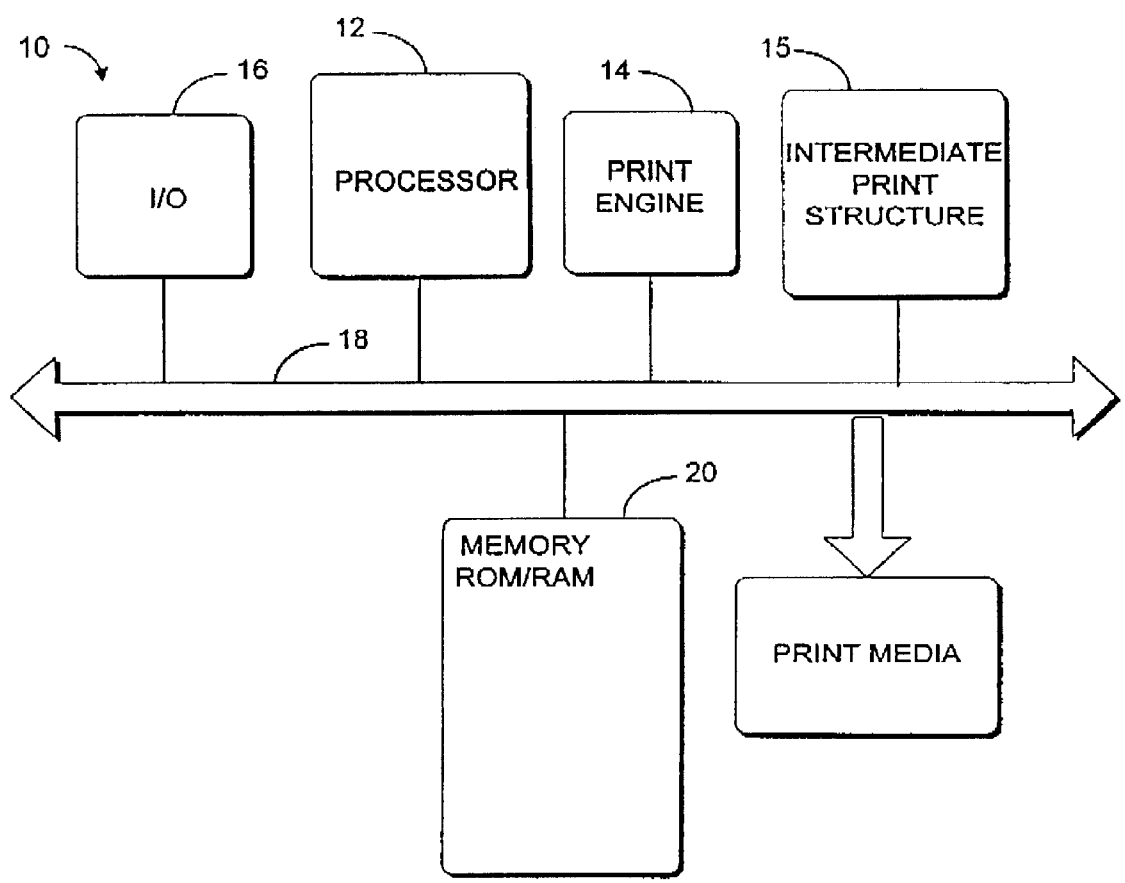
FIG. 1 is a high level system diagram of a printer system which can be used in accordance with one or more embodiments of the invention.

Hereinafter, the invention will be described in the context of a laser printer, however, it should be understood that other peripheral units such as plotters, facsimile units, etc. can also make use of the procedures contemplated by the invention.
Printer System FIG. 1 shows a printer system generally at 10 that includes a processor 12, a print engine 14, an intermediate print structure 15 (e.g. a drum) and an input/output (I/O) port 16, all connected by a bus 18. Print engine 14 comprises a laser printer which, when operated, runs at a constant speed and must be provided with video raster print data at a rate than keeps up with its operation. Memory 20 is provided and includes ROM (read only memory) and RAM (random access memory). Memory 20 is connected to bus 18 and contains all of the procedures necessary to assure that available RAM is most efficiently used, and that print engine 14 has data awaiting printing—as to avoid print overruns: The print engine and the intermediate print structure cooperate to produce a print media such as paper, having printed material thereon.

Printer 10, in this example, is a page printer and receives image data from a host processor via I/O 16. The amount of memory in RAM that is available to store the received image data is substantially less than that required to contain an entire video raster bitmap image of a page. The image data from the host processor is received via I/O 16 and read into RAM. Further principles of laser printer operation are described in the following patents, the disclosures of which are incorporated by reference: U.S. Pat. Nos. 5,479,587, 5,450,562, 5,459,818, 5,781,707, 5,129,049, 5,444,827, 5,524,186, and 5,463,776.

For purposes of the ongoing discussion, the reader is assumed to have some familiarity with laser printers and laser printer operation. Laser print engine 14 is capable of rendering images at a given dpi (dot per inch) resolution, such as 300, 600, or 1200 dpi, depending on design criteria. For purposes of this discussion, print engine 14 is a 1200 dpi engine. Under the principles of the present invention, image data is received and stored at a resolution format which is lower than the higher resolution format of print engine 14. Specifically, to take advantage of the present invention, image data may be stored at 300 or 600 dpi, and yet be rendered at 1200 dpi on engine 14 with improved resolution over conventional techniques. This provides higher resolution quality as capable by the higher resolution print engine 14, yet allows image data to be stored at lower resolution format for significant savings in both memory consumption and processing requirements.

Figure 2:
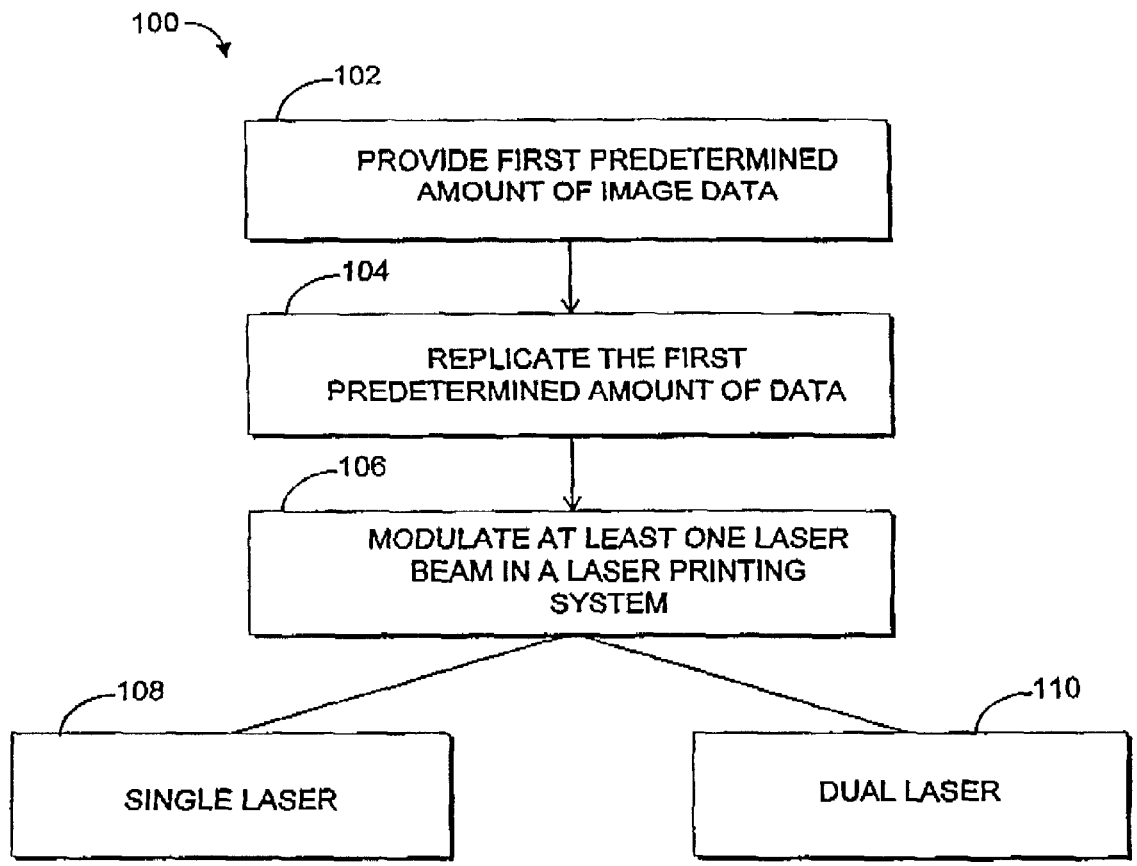
FIG. 2 is a flow diagram which illustrates various aspects of one or more embodiments of the present invention.

FIG. 2 shows a flow diagram which describes various aspects of one embodiment of the present invention generally at 100. At 102, a first predetermined amount of data is provide which is to be rendered onto a print medium. The first predetermined amount of data is provided in a first resolution format. Preferably, the first predetermined amount of data corresponds to digital data comprising a single scan line for a laser. At 104, and using the first predetermined amount of data from 102, the first predetermined amount of data is replicated to preferably provide multiple predetermined amounts of data. In this example, replication of the first predetermined amount of data takes place by simply reproducing it in identical form. Replication of the first predetermined amount of data is preferably sufficient to provide the first predetermined amount of data into a second resolution, format which is greater than the first resolution format. At 106, at least one laser beam in the printing system is modulated using the multiple predetermined amounts of data. In one preferred embodiment, the first predetermined amount of data is replicated to provide two identical amounts of predetermined digital data.

In one embodiment, the laser printing system comprises a single laser 108. This single laser is preferably modulated using the multiple predetermined amounts of data. In another embodiment, the laser printer system comprises two different lasers which are arranged in a so-called dual laser configuration 110. Here, the multiple predetermined amounts of data are used to modulate each laser with the same data. This is preferably done by having odd scan lines assigned to one laser, and even scan lines assigned to the other laser. Many different types of modulation can take place in the laser printer scenario, and the invention is not to be limited to any one particular type of modulation. For example, in one embodiment, modulation of the laser(s) takes place through pulse width modulation techniques. As an additional example, modulation can take place as described in U.S. Pat. No. 5,515,480, the disclosure of which is incorporated by reference.

Several advantages of the above-described replication are provided. First, lower resolution format data is provided into a higher resolution format in a straight-forward manner. More stability can be achieved insofar as gray scale quality is concerned. Memory requirements are lessened and lower clock rates can be used than with other conventional methods and techniques. In addition, greater perceptible print quality can be provided with no increase in memory and computational requirements. Photographic images will be half the resolution of the printer which saves processing time which is required before the printer actually starts printing.

In addition, in those embodiments utilizing a dual-laser configuration, high resolution output can be generated more quickly, and print speed is doubled because two lines of digital data can be written simultaneously. Aspect ratios of A original image are maintained by havlche second laser beam in the dual configuration use the same digital data as the first laser beam. This, in turn, increases dot stability by using larger spots, which can reduce the appearance of certain artifacts such as banding.

In one embodiment, the first predetermined amount of data which is provided at 102 comprises a plurality of image pixels. Each image pixel has associated therewith 2n intensity levels. Preferably, n is greater than or equal to four. Preferably, the intensity levels comprise gray levels. Consider that, in some instances, the number of gray levels per pixel has been 16, or 24. This number has, in the past, been carefully selected so that the memory and computational requirements would not increase. It should be noted that a gain in perceivable shades of gray diminishes considerably when the bit depth goes beyond six, i.e. 64 levels. The human eye can distinguish about 100 shades of gray at a screen frequency of 150 lines per inch, the point at which the half-tone clusters begin to disappear. In accordance with this embodiment, the number of gray levels per pixel need not be confined to only 16.

In another embodiment, the multiple predetermined amounts of data are configured to have print indicia which is representative of the individual multiple predetermined amounts of data positioned on an intermediate print structure prior to rendering onto a print medium. Preferably, at least one of the print indicia is manipulated relative to another of the print indicia so that it appears to be identically positioned on the intermediate print structure relative to the other print indicia.

Consider the following example where the "intermediate print structure" comprises a photoreceptor in the form of a drum, and the "print indicia" comprises the electrostatic charge which is placed on the drum by one or more lasers. In a situation where two identical streams of digital data are used to modulate one or more lasers, it is possible that the second modulation can be undesirably offset from the first modulation for any number of reasons. This aspect of the invention recognizes that this effect is undesirable, and compensates for it by manipulating the print indicia corresponding to the second modulation relative to the print indicia corresponding to the first modulation. Specifically, assume that processing is taking place using the dual-laser configuration. In this situation, we have the exact same modulated data streaming across both lasers. If one laser is out of synchronization with another laser, the result can be a stair step effect when the lasers are used in concert to place the charge on a drum. Preferably, in this example, the second stream of data is modified so that the actual charged particles or the charge across the drum will give the same physical appearance. The manipulation or modification of the second stream of data can take place in any way which is sufficient to provide the actual charged particles in the apparently same physical position on the drum. For example, if it is determined that the second stream is offset from the first stream by a particular amount as evidenced by the ultimately-rendered print medium, then the second steam might simply be shifted in position relative to the first stream. This would, accordingly, shift the charge associated with the second. stream on the drum by a corresponding amount. Various shifting algorithms can be used, with one example constituting shifting by pulse widths or fractions of pulse widths.

In another embodiment, manipulation of the print indicia can take place through so-called "adaptive window" techniques. Exemplary techniques are described in U.S. Pat. application Ser. No. 08/855,253, the disclosure of which is incorporated by reference.

Figure 3:
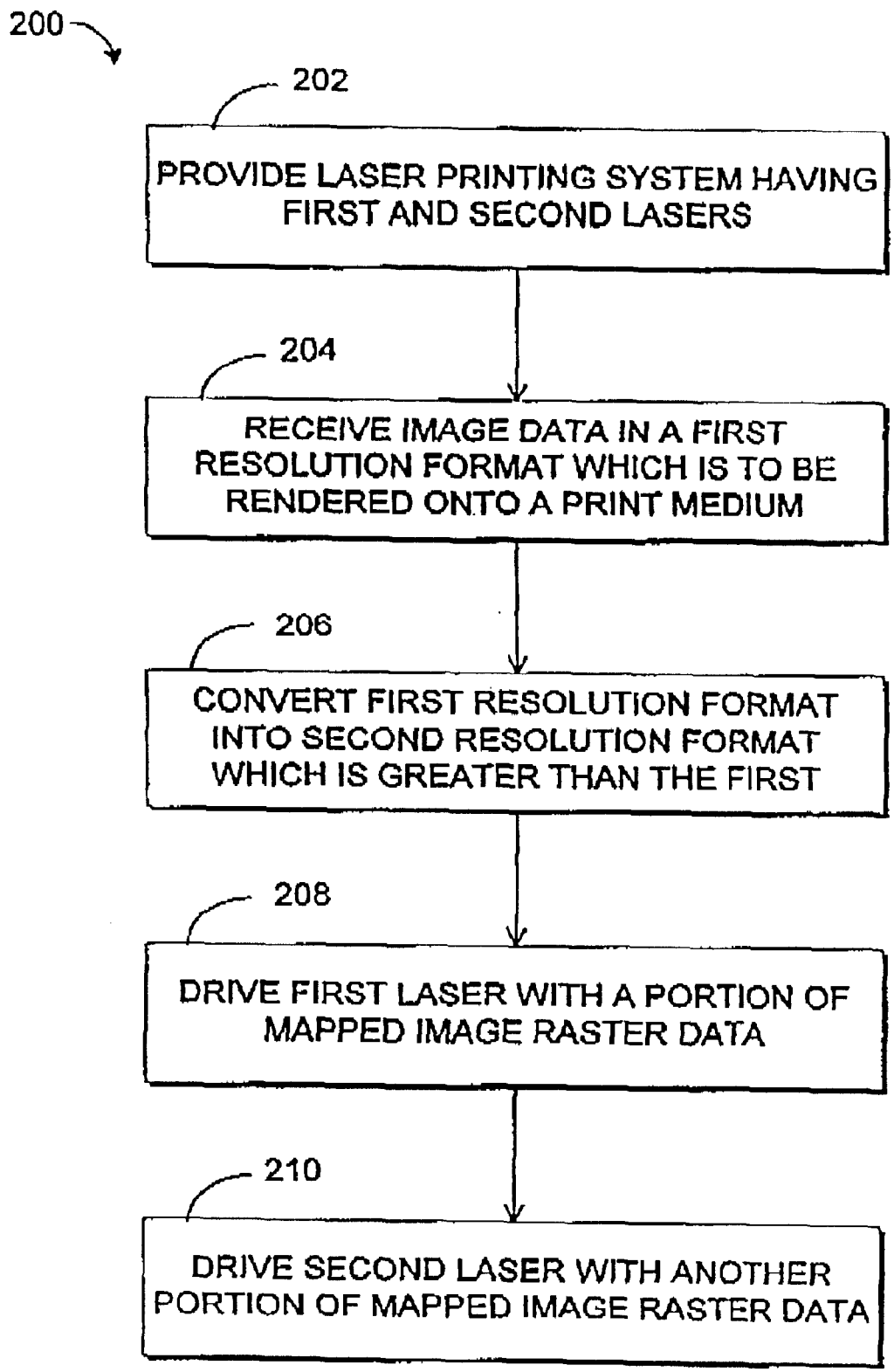
FIG. 3 is a flow diagram which illustrates various aspects of one or more embodiments of the present invention.

FIG. 3 shows a flow diagram which describes various aspects of another embodiment of the present invention generally at 200. At 202, a laser printing system is provided having first and second lasers which are configured to receive and be driven by raster data. At 204, image data is received which is to be rendered onto a print medium. The image data is preferably provided in a first resolution format. At 206, the first resolution format is converted into a second resolution format which is greater than the first resolution format. Preferably, the conversion of the first resolution format into the second resolution format takes place by mapping the image data to provide mapped image raster data in the second resolution format. At 208, the first laser is driven with a portion of the mapped image raster data. At 210, the second laser is driven with another portion of the mapped image raster data. In one embodiment, the driving of the first and second lasers at 208, 210 respectively comprises doing so with different portions of the mapped image raster data. This will become more apparent as the example of FIG. 4 is explained below. In another embodiment, the mapping of the image data which takes place at 206 comprises conducting a binary mapping procedure on the image data. In another embodiment, the mapping of the image data comprises conducting a modulation mapping procedure on the image data. In another embodiment, the second resolution format is greater than the first resolution format by no less than a factor of two.

With respect to the binary mapping procedure mentioned above, the reader is referred to FIG. 4 for an exemplary explanation. The following explanation is not intended to be limiting in any way, and constitutes but one way of conducting a binary mapping procedure in accordance with the invention. In the leftmost column of FIG. 4, there are four boxes, each of which is divided into "Laser 1" or "Laser 2". The four rightmost columns each. include four 2×2 matrices. Each matrix contains four values which are either a "1" or a "0". The collection of matrices provides a plurality of higher-resolution geometries which are selectable as described below. In one preferred embodiment, when the image data is received, it comprises a plurality of multi-bit values each of which represent a pixel in the first resolution format. In this example, assume that image data is received having a 600 dpi resolution. Typically, such image data can be received as a 4-bit value having a value from between 0 to 15. This 4-bit value represents one pixel of received image data. However, because of the binary mapping discussed just below, each 4-bit pixel value can be mapped to a higher resolution geometry which, in this example, constitutes four pixels of 1200 dpi resolution. In this example, each multi-bit value which is received is used as an index into a plurality of higher resolution geometries, individual ones of which are selected to provide the mapped image raster data at 206. So, for example, say that 600 dpi image data is received and has a value of "10". This value is used to index to the geometry which corresponds to the value of "10". This, in turn, and in this example, gives a particular 2×2 matrix having unique values, i.e. "0" or "1" in each of its so-called cells. These cell values are then used to drive the appropriate laser to provide the higher resolution format. For example, in the case of a 2×2 matrix, one half (the top half) of the matrix is used to drive Laser 1, and the other half (the bottom half) of the matrix is used to drive Laser 2.

In one preferred embodiment, the plurality of higher-resolution geometries comprises n×n matrices. It is possible, however, for the higher-resolution geometries to be other than n×n matrices. For example, the higher-resolution geometries might comprises m×n matrices, wherein m and n are different numbers.

With respect to the modulation mapping procedure mentioned above, the reader is referred to FIG. 5 for the following explanation. In this example, assume that data is received at 600×600, four bits per pixel. It is desired to map the data to 600×1200, i.e. 600 dpi wide and 1200 dpi tall. FIG. 5 shows sixteen matrices, each of which includes two cells. Each matrix corresponds to a single four-bit value of the 600×600 data, with an exemplary four-bit value being shown above each matrix. Each matrix represents the mapping output (at the higher resolution) that is used to drive the laser(s). In this example, Laser 1 is driven by the data in the top half of each matrix, while Laser 2 is driven by the data in the bottom half of each matrix. Each cell in each matrix contains a value. In this example, the values include: "0", "P1", "P2", "P3", and "P4". The "P*" values in the cells are predetermined calibrated laser modulation values. These values may or may not contain position information. Position information includes such things as "centered", "left-justified", "right-justified", or "split". Examples of position information are given in U.S. Pat. No. 5,515,480.

Figure 6:
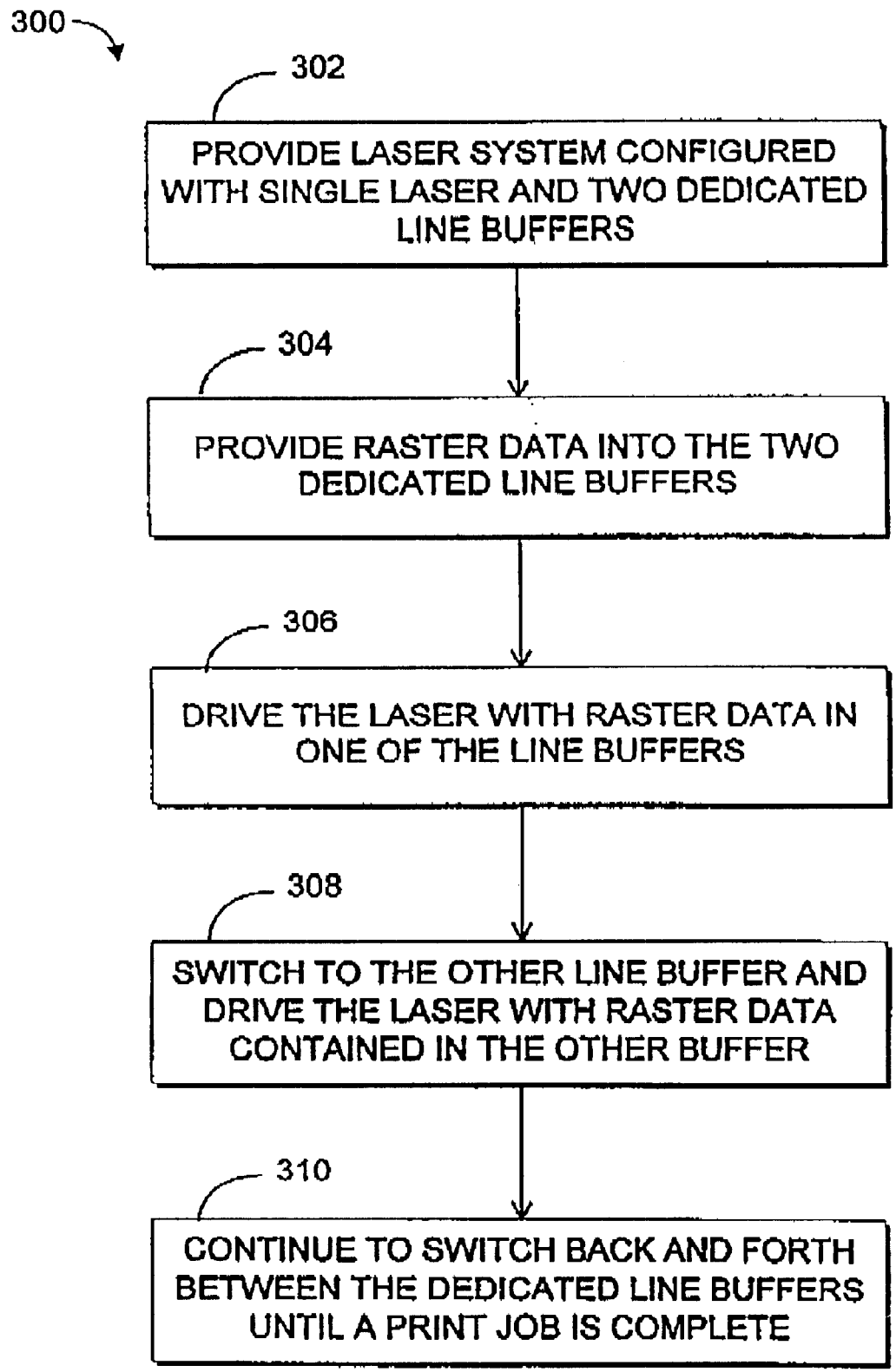
FIG. 6 is a flow diagram which illustrates various aspects of one or more embodiments of the present invention.

FIG. 6 shows a flow diagram which describes various aspects of another embodiment of the invention generally at 300. At 302, a laser printing system is provided and configured with a single laser and two dedicated line buffers. At 304, raster data is provided into the two dedicated line buffers. At 306, the single laser is driven with raster data which is contained in one of the dedicated line buffers. After driving the laser with the raster data in the one dedicated line buffer, a switching is effected to the other of the dedicated line buffers and the single laser is driven with raster data which is contained in the other of the two dedicated line buffers. Switching back and forth between the two dedicated line buffers is continued, at 310, until a print job is complete. Preferably, in this embodiment, the dual-beam configuration is replaced with a single laser and the two dedicated line buffers. With each successive scan line, the laser switches between the two line buffers. Each line buffer acts, in a sense, as a laser beam proxy which can be utilized in each or any of the embodiments described above. For example, in one embodiment, each dedicated line buffer can hold identical data so that the replicating effect described in connection with FIG. 2 can be achieved.

In one embodiment, the raster data which is provided into the two dedicated line buffers comprises identical raster data as initially provided. In another embodiment, the raster data which is provided into the two dedicated line buffers is configured to have print indicia which is representative of the individual raster data in each line buffer positioned onto an intermediate print structure prior to rendering onto a print medium. In this embodiment, at least one of the print indicia is manipulated relative to another of the print indicia, so that it appears to be identically positioned on the intermediate print structure relative to the other print indicia. Examples of this type of processing are described above.

In yet another embodiment, image data which is to be rendered onto a print medium is received in a first resolution format. The first resolution format is converted into a second resolution formation which is greater than the first resolution format. Preferably this takes place by mapping the image data to, provide mapped image data in the second resolution format as described above. Provision of the raster data into the two dedicated line buffers at 304 preferably comprises providing the mapped image data into the two dedicated line buffers.

Various embodiments of the invention carry with them the advantages of processing lower-resolution format data into higher resolution format data with little or no impact on memory consumption. In addition, advantages can be attained insofar as reductions in clock rates over clock rates which are currently required with conventional binary or multi-bit halftoning at higher resolutions. Other advantages will be apparent to those of skill in the art.

Although the invention has been described in language specific to structural features and/or methodical steps, it is to be understood that the invention which is defined in the appended claims is not necessarily limited to the specific features or steps described. Rather, the specific features and steps are disclosed as preferred forms of implementing the claimed invention.

What is claimed is:

1. A method of providing lower resolution format data into a higher resolution format comprising:

providing a laser printing system configured with a single laser and two dedicated line buffers;

providing identical raster data into the two dedicated line buffers;

driving the single laser with raster data which is contained in one of the dedicated line buffers;

after said driving, switching to the other of the two dedicated line buffers and driving the single laser with raster data which is contained in the other of the two dedicated line buffers; and continuing to provide identical raster data into the two dedicated line buffers and switching back and forth between the two dedicated line buffers to drive the single laser until a print job is complete, said continuing providing a lower resolution format data into a higher resolution format data.

2. The method of claim 1, wherein the raster data which is provided into the two dedicated line buffers is configured to have print indicia which is representative of the individual raster data in each line buffer positioned onto an intermediate print structure prior to rendering onto a print medium, and further comprising manipulating at least one of the print indicia relative to another of the print indicia so that it appears to be identically positioned on the intermediate print structure relative to the other print indicia.

3. A method of providing lower resolution format data into a higher resolution format comprising:

providing a laser printing system configured with a single laser and two dedicated line buffers;

receiving image data which is to be rendered onto a print medium, the image data being received in a first resolution format;

converting the first resolution format into a second resolution format which is greater than the first resolution format by mapping the image data to provide mapped image data in the second resolution format, said mapping comprising using multi-bit values associated with the image data in the first resolution format as an index into a plurality of higher resolution geometries to provide the mapped image data;

providing raster data into the two dedicated line buffers by providing the mapped image data into the two dedicated line buffers;

driving the single laser with raster data which is contained in one of the dedicated line buffers;

after said driving, switching to the other of the two dedicated line buffers and driving the single laser with raster data which is contained in the other of the two dedicated line buffers; and continuing to provide raster data into the two dedicated line buffers and switching back and forth between the two dedicated line buffers to drive the single laser until a print job is complete, said continuing providing a lower resolution format data into a higher resolution format data.

* * * * *